Patented Aug. 9, 1949

2,478,737

UNITED STATES PATENT OFFICE 2,478,737

PREPARATION OF 2-CHLORO-1,3 BUTADIENE CO-POLYMERS HAVING IMPROVED STABILITY

Robert S. Barrows, Claymont, Del., assignor to E. I. du Pont de Nemours & Company, Wilmington, Del., a corporation of Delaware No Drawing. Application April 2, 1946, Serial No. 659,154

10 Claims. (Cl. 260—45.9)

This invention relates to the processing of producing synthetic rubber-like materials, and more particularly to an improved process for preparing copolymers of 2-chloro-1,3-butadiene with 1,3-diene hydrocarbons which have improved stability against deterioration due to aging.

It is known that certain anti-oxidants of the diphenyl-amine type, such as phenyl-alpha-naphthylamine and phenyl-beta-naphthylamine, when incorporated in synthetic rubber-like materials, improve the stability of the same against deterioration on aging. It is also known that tetraethyl thiuram disulfide and similar compounds such as described in U. S. Patent 2,259,122, are useful stabilizing agents for 2-chloro-1,3-butadiene polymers. Due to the fact that the phenyl-alpha-naphthylamine type of stabilizing agent in many cases does not impart to the synthetic rubber-like material a sufficient degree of stability against aging, it has been necessary to employ with the anti-oxidant a stabilizing agent such as tetraethyl thiuram disulfide. While the tetraethyl thiuram disulfide type of stabilizing materially improves the stability of the synthetic elastomer on aging, its use presents certain difficulties for the tetraethyl thiuram disulfide is also a powerful vulcanizing agent for the sulfur vulcanization of rubber so that its use as a stabilizing agent in chloroprene polymers to be mixed with rubber is undesirable. Furthermore, the tetraethyl thiuram disulfide is a very effective vulcanization accelerator for copolymers of 2-chloro-1,3-butadiene and isoprene or butadiene, so that the quantity that can be employed with these copolymers is limited and its use materially curtails the usefulness of the resulting polymers.

It is an object of this invention to provide a process for improving the stability of copolymers of 2-chloro-1,3-butadiene with 1,3-diene hydrocarbons and to provide polymers having improved stability on aging.

I have found that the stability of copolymers of 2-chloro-1,3-butadiene with 1,3-diene hydrocarbons on aging can be materially improved by incorporating in the polymeric material a compound of the following general formula:

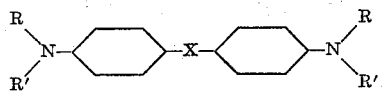

in which X stands for a divalent radical of the group —CO—, —CHOH—, —CH$_2$—, —CHC$_6$H$_5$— and —CHC$_6$H$_4$NRR'—, and R and R' stand for a radical of the group consisting of alkyl groups containing from 1 to 4 carbon atoms and the benzyl group, including those compounds of said formula wherein not more than two of the hydrogens of the benzene radicals in the molecule are replaced by a substituent of the group consisting of alkyl groups containing from 1 to 4 carbon atoms, halogen, nitro and sulfonic acid groups.

While the incorporation of the agents of the formula above given in copolymers of 2-chloro-1,3-butadiene and 1,3-diene hydrocarbons very materially improve the stability of the same against aging, I prefer to employ these agents together with an anti-oxidant of the diarylamine class such as phenyl-alpha-naphthylamine or phenyl-beta-naphthylamine. The stabilizing agent should be incorporated in the polymer as soon as possible after it is formed, and preferably prior to coagulation of the latex, although substantially the same effect can be obtained by incorporating them in the polymer while it is worked on the mill. The anti-oxidants, as well as the new stabilizing agent, are also preferably incorporated in the polymers by addition to the polymer dispersion prior to coagulation or by addition to the solid polymer on the rubber mill.

Illustrative compounds of the class above described, which have been found to be effective stabilizing agents for 2-chloro-1,3-butadiene polymers and which have an even greater stabilizing effect on the copolymers of 2-chloro-1,3-butadiene and 1,3-diene hydrocarbons such as 1,3-butadiene and isoprene, are tetramethyl-p,p'-diamino-diphenyl methane, tetramethyl-p,p'-diamino-diphenyl carbinol (Michler's hydrol), tetramethyl-p,p'-diamino-diphenyl ketone (Michler's ketone), dialkyl amino and alkyl aralkyl amino triphenyl methane derivatives such as leuco malachite green, malachite green, leuco crystal violet, crystal violet, 4-ethyl-benzyl amino-2-methyl-4'-ethyl-benzyl amino-2'-methyl-2''-chloro triphenyl methane, and similar compounds.

The stabilizing agents of this invention are preferably employed together with anti-oxidants of the phenyl-alpha-naphthylamine or phenyl-beta-naphthylamine type. When employed in combination with the anti-oxidants, from 0.4% to 1.0% of such anti-oxidant, based on the weight of the polymer, has been found to give very satisfactory results. The stabilizing agents of this invention, such as those more specifically mentioned above, may be employed in an amount varying from 0.1% to 4%, based on the weight of the polymer, although the use of from 0.5% to 1.0% will be found to give satisfactory results, and this amount is preferred when the tetramethyl-p,p'-diamino-diphenyl methane is used. The copolymers of the 2-chloro-1,3-butadiene and the 1,3-diene hydrocarbon to which this invention particularly relates are those which contain from 40% to 95% of chloroprene and from 60% to 5% of the 1,3-diene hydrocarbon.

The following examples are given to illustrate this invention. The parts used are by weight, unless otherwise specified.

To 830 grams of a polymerized emulsion, containing 35% of a copolymer whose composition is about 20% of isoprene and 80% of 2-chloro-1,3-butadiene and in which sulfated oleyl acetate is used as a dispersing agent, was added 6.6 grams of an emulsion made by suspending 100 grams of a melt consisting of 45% of diphenylamine and 55% of phenyl-alpha-naphthylamine in 100 cc. of water containing 1 gram of a dispersing agent (such as the sodium salt of the condensation product of formaldehyde and naphthalene sulfonic acids) and 4 grams of an emulsifying agent (such as sulfated oleyl acetate). The purpose of the diphenylamine is to lower the melting point of the phenyl-alpha-naphthylamine so as to prevent solidification of the anti-oxidant emulsion. The stabilizing agent (6.6 grams), as identified in the following table, was dissolved or suspended in 20 cc. of benzene and the resultant mixture was dispersed with 40 cc. of water containing 0.6 gram of a dispersing agent (as above) and 1.8 grams of sulfated oleyl acetate. This dispersion was stirred into the copolymer dispersion. The copolymer was isolated by coagulating the dispersion with sodium chloride brine in the usual manner. The coagulum was washed with water on a corrugated rubber mill to remove emulsifying agents, and was dried on a smooth rubber mill. Examples illustrating the improved stability of products of this invention, as compared to control samples from the same batch of polymer containing only the diphenylamine and phenyl-alpha-naphthylamine, are given as follows:

| Example Number | Stabilizing Agent | Plasticity-Recovery Numbers | |
|---|---|---|---|
| | | Original | After 4 days at 70° C. |
| 1 | None | 130-116 | 164-171 |
| | Tetramethyl-p,p'-diamino diphenyl methane | 115-13 | 114-46 |
| 2 | None | 134-99 | 144-141 |
| | Tetramethyl-p,p'-diamino diphenyl ketone (Michler's Ketone) | 123-102 | 113-82 |
| 3 | None | 104-8 | 129-93 |
| | 4-Dimethyl amino-4'-dimethyl amino triphenyl methane (Leuco Malachite Green) | 106-10 | 108-10 |
| 4 | None | 112-57 | 156-169 |
| | Malachite Green | 96-7 | 102-16 |
| 5 | None | 130-98 | 162-174 |
| | 4-Dimethylamino-4'-dimethylamino-4''-dimethylamino triphenyl methane (leuco crystal violet) | 105-5 | 104-2 |
| 6 | None | 133-102 | 167-168 |
| | Crystal Violet | 118-82 | 110-62 |
| 7 | None | 104-8 | 129-93 |
| | 4-Ethyl benzyl amino-2-methyl-4'-ethyl benzyl amino-2'-methyl-2''-chloro triphenyl methane | 97-1 | 101-4 |
| 8 | None | 104-8 | 129-93 |
| | 4-Ethyl benzyl amino-2-sulfo-4'-ethyl benzyl amino-2'-sulfo triphenyl methane | 102-5 | 113-12 |

*Example 9*

20 grams of a freshly prepared copolymer of isoprene and 2-chloro-1,3-butadiene, whose composition is about 20% isoprene and about 80% of 2-chloro-1,3-butadiene, was milled on a 6 inch rubber mill. Phenyl-alpha-naphthylamine (0.1 gram) and leuco malachite green (0.1 gram) were added and thoroughly mixed with the elastomer. The resultant polymer had an original plasticity number of 100 with a recovery number of 4, and, after 4 days' aging at 70° C., the plasticity number was 102 and the recovery number was 1. This excellent stability is much greater than that observed when phenyl-alpha-naphthylamine is used alone.

*Example 10*

To 830 grams of a dispersion of a 2-chloro-1,3-butadiene-isoprene copolymer (as described in Examples 1 to 8), was added an emulsion of 6.6 grams of tetramethyl-p,p'-diamino diphenyl methane (made as described in previous examples). The polymer was coagulated, washed and dried after the manner previously described. As shown below, the polymer containing the tetramethyl-p,p'-diamino diphenyl methane was much more stable than similar polymer to which a like amount of either diphenylamine or phenyl-alpha-naphthylamine had been added.

| Stabilizing Agent | Plasticity-Recovery Number | |
|---|---|---|
| | Original | After 4 days at 70° C. |
| Diphenylamine | 114-16 | 160-170 |
| Phenyl-alpha-naphthylamine | 116-34 | 132-153 |
| Tetramethyl-p,p'-diamino diphenyl methane | 90-4 | 100-5 |

*Example 11*

To 20 grams of a freshly prepared copolymer, containing 11% of 1,3-butadiene and 89% of 2-chloro-1,3-butadiene, was added, on a rubber mill, 0.2 gram of phenyl-alpha-naphthylamine and 0.2 gram of tetramethyl-p,p'-diamino diphenyl methane. Milling was continued until the stabilizing ingredients had been thoroughly mixed with the elastomer. The resulting composition exhibited excellent stability.

This invention is particularly useful in producing elastomers which have improved storage stability, and, since this stability has been produced without using agents which are powerful vulcanization accelerators for the sulfur vulcanization of rubber or copolymers of 2-chloro-1,3-butadiene with isoprene or butadiene, these polymers may be used in contact with or in admixture with rubber, without experiencing the difficulties that result when polymers, stabilized with tetraethyl thiuram disulfide and the like, are used. Furthermore, stabile copolymers of 2-chloro-1,3-butadiene and isoprene or butadiene may now be made which are free from tetraethyl thiuram disulfide and the like, and therefore offer the compounder much more latitude in selecting his vulcanization conditions. This is of importance because it is often necessary to get different degrees and types of vulcanization for specific purposes, and the presence of a strong vulcanization accelerator as a stabilizing agent seriously limits the choice of vulcanizing conditions.

I claim:

1. The process for producing copolymers containing from 40% to 95% of 2-chloro-1,3-butadiene and from 60% to 5% of a 1,3-diene hydrocarbon of the group consisting of 1,3-butadiene and isoprene having improved stability against deterioration due to aging, which comprises intimately incorporating with the polymeric material after the formation of the co-polymer is completed and prior to vulcanization from 0.1% to 4%, based on the polymeric material, of a compound of the class consisting of those having the following general formula:

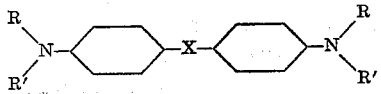

in which X stands for a divalent radical of the group —CO—, —CHOH—, —CH₂—, —CHC₆H₅— and —CHC₆H₄N(CH₃)₂—, R stands for a radical of the group consisting of methyl, ethyl and benzyl radicals and R' stands for a radical of the group consisting of methyl and ethyl radicals, and those of said formula wherein not more than two of the hydrogens of the benzene radicals in the molecule are replaced by a substituent of the group consisting of alkyl groups containing not more than 2 carbon atoms, halogen, and sulfo radical.

2. The process for producing copolymers containing from 40% to 95% of 2-chloro-1,3-butadiene and from 60% to 5% of a 1,3-diene hydrocarbon of the group consisting of 1,3-butadiene and isoprene having improved stability against deterioration due to aging, which comprises intimately incorporating with the polymeric material after the formation of the co-polymer is completed and prior to vulcanization, from 0.4% to 1.0%, based on the weight of the polymeric material, of a phenylnaphthylamine anti-oxidant and from 0.1% to 4%, based on the weight of the polymeric material, of a compound of the class consisting of those having the following general formula:

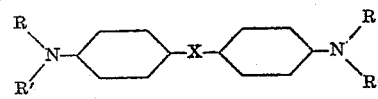

in which X stands for a divalent radical of the group —CO—, —CHOH—, —CH₂—, —CHC₆H₅— and —CHC₆H₄N(CH₃)₂—, R stands for a radical of the group consisting of methyl, ethyl and benzyl radicals and R' stands for a radical of the group consisting of methyl and ethyl radicals, and those of said formula wherein not more than two of the hydrogens of the benzene radicals in the molecule are replaced by a substituent of the group consisting of alkyl groups containing not more than 2 carbon atoms, halogen, and sulfo radical.

3. The process for producing copolymers containing from 40% to 95% of 2-chloro-1,3-butadiene and from 60% to 5% of a 1,3-diene hydrocarbon of the group consisting of 1,3-butadiene and isoprene having improved stability against deterioration due to aging, which comprises intimately incorporating with the polymeric material after the formation of the co-polymer is completed and prior to vulcanization, from 0.5% to 1.0% of tetramethyl-p,p'-diamino-diphenyl methane, based on the weight of the polymeric material.

4. The process for producing copolymers containing from 40% to 95% of 2-chloro-1,3-butadiene and from 60% to 5% of a 1,3-diene hydrocarbon of the group consisting of 1,3-butadiene and isoprene having improved stability against deterioration due to aging, which comprises intimately incorporating with the polymeric material after the formation of the co-polymer is completed and prior to vulcanization, from 0.4% to 1.0% of a phenyl-naphthylamine anti-oxidant and from 0.5% to 1.0% of tetramethyl-p,p'-diamino-diphenyl methane, both based on the weight of the polymeric material.

5. The process for producing copolymers containing from 40% to 95% of 2-chloro-1,3-butadiene and from 60% to 5% of isoprene and having improved stability against deterioration due to aging, which comprises intimately incorporating with said copolymer after the formation of the co-polymer is completed and prior to vulcanization, from 0.4% to 1.0% of a phenyl-naphthylamine anti-oxidant and from 0.5% to 1.0% of tetramethyl - p,p' - diamino - diphenyl methane, both based on the weight of the copolymer.

6. An unvulcanized synthetic rubber-like copolymer containing from 40% to 95% of 2-chloro-1,3-butadiene and from 60% to 5% of a 1,3-diene hydrocarbon of the group consisting of 1,3-butadiene and isoprene, which has improved stability against deterioration due to aging, having intimately incorporated therein from 0.1% to 4%, based on the weight of the polymeric material, of a compound of the class consisting of those having the following general formula:

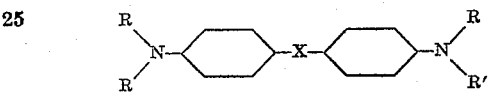

in which X stands for a divalent radical of the group —CO—, —CHOH—, —CH₂—, —CHC₆H₅— and —CHC₆H₄N(CH₃)₂, R stands for a radical of the group consisting of methyl, ethyl and benzyl radicals and R' stands for a radical of the group consisting of methyl and ethyl radicals, and those of said formula wherein not more than two of the hydrogens of the benzene radicals in the molecule are replaced by a substituent of the group consisting of alkyl groups containing not more than 2 carbon atoms, halogen, and sulfo radical.

7. An unvulcanized synthetic rubber-like copolymer containing from 40% to 95% of 2-chloro-1,3-butadiene and from 60% to 5% of a 1,3-diene hydrocarbon of the group consisting of 1,3-butadiene and isoprene, which has improved stability against deterioration due to aging, having intimately incorporated therein from 0.4% to 1.0%, based on the weight of the polymeric material, of a phenylnaphthylamine antioxidant and from .01% to 4%, based on the weight of the polymeric material, of a compound of the class consisting of those having the following general formula:

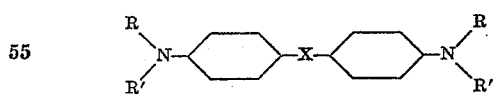

in which X stands for a divalent radical of the group —CO—, —CHOH—, —CH₂—, —CHC₆H₅— and —CHC₆H₄N(CH₃)₂, R stands for a radical of the group consisting of methyl, ethyl and benzyl radicals and R' stands for a radical of the group consisting of methyl and ethyl radicals, and those of said formula wherein not more than two of the hydrogens of the benzene radicals in the molecule are replaced by a substituent of the group consisting of alkyl groups containing not more than 2 carbon atoms, halogen and sulfo radical.

8. An unvulcanized synthetic rubber-like copolymer containing from 40% to 95% of 2-chloro-1,3-butadiene and from 60% to 5% of a 1,3-diene hydrocarbon of the group consisting of 1,3-butadiene and isoprene, which has improved stability against deterioration due to aging, having intimately incorporated therein from 0.5% to 1.0%, based on the weight of the polymeric material, of tetramethyl - p,p' - diamino-diphenyl methane.

9. An unvulcanized synthetic rubber-like co-polymer containing from 40% to 95% of 2-chloro-1,3-butadiene and from 60% to 5% of a 1,3-diene hydrocarbon of the group consisting of 1,3-butadiene and isoprene, which has improved stability aganist deterioration due to aging, having intimately incorporated therein from 0.4% to 1.0% of a phenyl-naphthylamine antioxidant and from 0.5% to 1.0% of tetramethyl-p,p'-diamino-diphenyl methane, both based on the weight of the polymeric material.

10. An unvulcanized rubber-like co-polymer containing from 40% to 95% of 2-chloro-1,3-butadiene and from 60% to 5% of isoprene, which has improved stability against deterioration due to aging, having intimately incorporated therein from 0.4% to 1.0% of a phenyl-naphthylamine antioxidant and from 0.5% to 1.0% of tetramethyl-p,p'-diamino-diphenyl methane, both based on the weight of the co-polymer.

ROBERT S. BARROWS.

REFERENCES CITED

The following references are of record in the file of this patent:

UNITED STATES PATENTS

| Number | Name | Date |
|---|---|---|
| 1,787,064 | Calcott | Dec. 30, 1930 |
| 1,787,065 | Calcott | Dec. 30, 1930 |
| 1,930,051 | Howland | Oct. 10, 1933 |
| 1,954,377 | Calcott | Apr. 10, 1934 |
| 2,259,122 | Walker | Oct. 14, 1941 |

OTHER REFERENCES

"Duprene," Rubber Age, December 10, 1931, page 218.